United States Patent [19]

Soper

[11] 3,755,346

[45] Aug. 28, 1973

[54] 2,6-BIS(TRIFLUOROMETHYL)-4-NITROBENZIMIDAZOLE

[76] Inventor: Quentin F. Soper, 2120 W. 38th St., Indianapolis, Ind. 46208

[22] Filed: Apr. 28, 1971

[21] Appl. No.: 138,343

Related U.S. Application Data

[63] Continuation-in-part of Ser. Nos. 812,449, April 1, 1969, abandoned, and Ser. No. 523,016, Jan. 26, 1966, Pat. No. 3,632,397, said Ser. No. 812,449, is a continuation-in-part of Ser. No. 726,540, May 3, 1968, abandoned.

[52] U.S. Cl.................. 260/309.2, 71/92, 260/581, 260/622 P, 260/646
[51] Int. Cl............................................ C07d 49/38
[58] Field of Search................................. 260/309.2

[56] References Cited
UNITED STATES PATENTS
3,515,866  6/1970  Goldsmith et al. ............... 260/309.2

FOREIGN PATENTS OR APPLICATIONS

| 1,509,499 | 12/1967 | France............... 260/309.2 |
| 6,603,719 | 9/1966 | Netherlands......... 260/309.2 |
| 1,482,315 | 4/1967 | France............... 260/309.2 |
| 1,430,139 | 1/1966 | France............... 260/309.2 |
| 1,426,887 | 12/1965 | France............... 260/309.2 |
| 1,087,561 | 10/1967 | Great Britain....... 260/309.2 |
| 1,554,846 | 12/1968 | France............... 260/309.2 |

*Primary Examiner*—Natalie Trousof
*Attorney*—Everet F. Smith and James L. Rowe

[57] ABSTRACT

2-Fluoroalkyl-6-fluoromethyl-4-nitrobenzimidazoles, useful as herbicides, insecticides and nematicides, and as intermediates in the preparation of other pesticides.

1 Claim, No Drawings

2,6-BIS(TRIFLUOROMETHYL)-4-NITROBENZIMIDAZOLE

CROSS-REFERENCE

This application is a continuation-in-part application of my co-pending applications, Ser. No. 812,449, filed Apr. 1, 1969, and now abandoned, and Ser. No. 523,016, filed Jan. 26, 1966, now U.S. Pat. No. 3,632,397, said Ser. No. 812,449 being a continuation-in-part of my then copending application Ser. No. 726,540, filed May 3, 1968, now abandoned.

BACKGROUND OF THE INVENTION

Benzimidazoles are known to be useful in combating intestinal parasites of mammals and birds. Furthermore, 2-trifluoromethylbenzimidazoles have been found to be useful as herbicides, nematicides, molluscicides and insecticides. (British patent 1,087,561; U.S. Pat. No. 3,412,101; U.S. Pat. No. 3,542,923; South African patent 64/5584; Netherlands patent 67,13786; (Derwent Basic No. H2118) are exemplary.) The 2-trifluoromethyl derivatives most frequently employed as insecticides have been substituted in the benzene portion of the benzimidazole ring system with chlorine and nitro groups, with the most active compounds being 2-trifluoromethyl-4,5,6,7-tetrachlorobenzimidazole, 2-trifluoromethyl-5,6-dichlorobenzimidazole, and 2-trifluoromethyl-4-nitro-6-chlorobenzimidazole. As insecticides, these compounds have shown their greatest activity against insects of the order Lepidoptera, such as Southern armyworm, and of the order Diptera, such as houseflies and mosquitoes. For example, 2-trifluoromethyl-4,5-dichlorobenzimidazole gives a complete kill of Southern armyworm larvae at 250 ppm, but is without action against milkweed bugs, oriental roaches, and boll weevils at that same concentration, and, in fact, its activity against houseflies is excellent only at 1,000 ppm. The isomeric compound, 2-trifluoromethyl-5,6-dichlorobenzimidazole, has the same excellent activity at the same level against milkweed bugs, houseflies, oriental roach and boll weevil. In general, these chlorinated benzimidazoles do not approach, in absolute activity, the organic phosphate insecticides, nor do they have the same broad spectrum of action.

As herbicides, the prior-art benzimidazoles, according to South African Patent 64/4256, have LD95's (dose necessary to kill 95 percent of various weed species) ranging from less than 1 lb. per acre for broadleaf weeds to about 10 lbs. per acre for grasses. Australian Patent 40642/64 (Derwent Basic No. G-4149) discloses marked activity of a number of benzimidazoles against a group of plants at rates varying from about 0.1 to 10 lbs. per acre. Most of the prior art emplasis, however, has been on those benzimidazoles which were post-emergent broadleaf herbicides rather than grass herbicides.

The use of benzimidazoles as nematicides is illustrated by many of the above patents as well as by U.S. Pat. No. 3,443,015.

It is an object of this invention to provide novel benzimidazoles having enhanced insecticidal, herbicidal and/or nematicidal activity compared with those disclosed in the prior art.

SUMMARY

The compounds of this invention can be represented by the formula

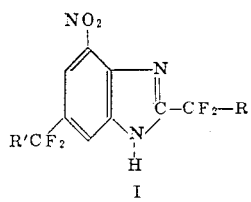

I wherein R is H, Cl, F, CF3, C2F5, or C3F7 and R' is H, F, or Cl. Also included within the scope of this invention are the cationic salts of benzimidazoles according to the above formula, such salts including the alkali metal salts such as the potassium, lithium, sodium, barium, or strontium salts and the ammonium salt.

In the above formula, it will be recognized that each benzimidazole molecule exists in two tautomeric forms, one of which is named (when R and R' are F) 2,6-bis(trifluoromethyl)-4-nitrobenzimidazole and the other 2,5bis(trifluoromethyl)-7-nitrobenzimidazole. Both of these structures exist in equilibrium in any preparation of the pure compound and both are included within the scope of this invention as well as within the scope of the above formula.

Compounds coming within the scope of this invention include:

2,6-bis(trifluoromethyl)-4-nitrobenzimidazole
2,5-bis(trifluoromethyl)-7-nitrobenzimidazole
2-pentafluoroethyl-5-trifluoromethyl-7-nitrobenzimidazole
2-heptafluoropropyl-5-difluoromethyl-7-nitrobenzimidazole
2,6-bis(chlorodifluoromethyl)-4-nitro-benzimidazole
2-trifluoromethyl-5-chlorodifluoromethyl-7-nitrobenzimidazole
2-difluoromethyl-6-trifluoromethyl-7-nitrobenzimidazole In using the compounds of this invention as insecticides, an insecticidal or acaricidal amount of a benzimidazole according to the above formula is applied to the insect or arachnid habitat, which habitat might be, for example, the foliage or other parts of a living plant when aphids, mites, milkweed bug, or the like are to be combated, or the soil in which a crop has been planted, as when it is desired to combat corn rootworm or the like. Again, the insect habitat might be the wall of a building when it is desired to combat flies or mosquitoes.

The insecticidally-active benzimidazole can be applied to the arachnid or insect habitat in pure or relatively pure form if desired; that is to say, unmixed with other constituents. Such a method of application is, however, wasteful inasmuch as the compounds are active at such extremely low rates, as will be delineated hereinafter. Thus, the insecticidal and acaricidal properties of 2-fluoroalkyl-6-fluoromethyl-4-nitrobenzimidazoles are preferably secured by application of a formulation containing the benzimidazole as the active agent dispersed in a suitable inert carrier, with or without other compatible fungicidal, bactericidal, insecticidal, or herbicidal ingredients.

Benzimidazole-containing compositions are most satisfactorily formulated for insecticidal use as emulsifiable concentrates or dusts, although a granular formulation or wettable powder can also be used. Those compositions which are adapted for direct spraying or dusting upon the insect or arachnid habitat are prepared by methods well known to the art, as for example by mixing the benzimidazole with a non-phytotoxic diluent such as water plus a surface-active agent to provide an emulsifiable concentrate, or such as clay, bentonite, silica, hydrous alumina, kieselguhr, or diatomaceous earth to provide a dusting powder or wettable powder where a surfactant is included or with one of these latter ingredients followed by compression of the resulting mixture to provide a granular formulation. The dusting powder and granular formulations are customarily used as such, but wettable powders and emulsifiable concentrates are first prepared as a concentrate and then further diluted with a non-phytotoxic material prior to use. The insecticidally-active benzimidazole is customarily present in the diluted dust or spray in a concentration varying from about 0.0025 percent to upwards of about 5 percent or preferably from 0.01–0.6 percent. The concentration of benzimidazole in concentrates used for preparing wettable powders or emulsifiable concentrates is necessarily far higher and can vary from 5 percent up to as high as 80 or 90 percent if desired. The above insecticidally-active compositions are applied to the insect or arachnid habitat by means of spray guns, dust guns, spreaders, or the like.

The amount of benzimidazole to be applied for insect or arachnid control purposes to a given area of plant life is, of course, dependent upon a variety of factors, such as the extent of vegetative surface to be covered, the severity of the insect infestation, the condition of the foilage treated, the temperature, the humidity, and the susceptibility of the plant to the herbicidal action of the compound, etc. In general, however, the application of about 0.025 to about 1.0 pounds of a benzimidazole represented by the above formula per acre of insect-infested plant life provides effective insecticidal action. The application to plant foliage to the point of runoff of aqueous compositions containing from about 0.01 to about 0.6 percent on a weight-volume basis of a benzimidazole effectively controls the insecticidal or acaricidal life thereon. Alternatively, a light but complete dusting of plant foliage with a dusting composition containing, by weight, about 0.01 to about 0.6 percent of the benzimidazole also gives effective insecticidal or acaricidal control.

As previously stated, the benzimidazoles of this invention are also herbicidally active, but are insecticidally active at concentrations far below those at which marked herbicidal activity is evident. At any rate, the range of usefulness of the above benzimidazoles as insecticides will be governed not only by the insect to be eliminated but also by the plant species on which it occurs. Naturally, where there is no plant life or where damage to plant life is unimportant, only the concentration of benzimidazole necessary to control the insect need be considered. Specifically, in killing houseflies in a dairy or on a railroad right-of-way, an amount of a benzimidazole sufficient to eliminate the insect can be used, but if insects are present in a crop such as soybeans, the susceptibility of the crop to the herbicidal effects of the benzimidazole should be determined before spraying or dusting to control the insect.

Illustrative formulations useful in the process of this invention include the following:

I. Wettable Powder
25 percent 2,6-bis(trifluoromethyl)-4-nitrobenzimidazole,
70.5 percent Kaolin
3 percent alklarylpolyether alcohol,
1.1 percent sodium lignin sulfonate II. Granules
An impregnating solution is prepared containing six parts of 2,6-bis(trifluoromethyl)-4-nitrobenzimidazole mixed with four parts of methyl cellosolve. Seventeen and two-tenths grams of this solution is sprayed onto 82.8 g. of diatomaceous earth, and the mixture is compressed into granules containing 10 percent of active ingredient.

III. Granules
An impregnating solution is prepared containing six parts of the sodium salt of 2,6-bis(trifluoromethyl)-4-nitrobenzimidazole and four parts tap water. Seventeen and two-tenths grams of the solution is sprayed onto diatomaceous earth as before and the sprayed material compressed into granules containing 10 percent active ingredient.

IV. Dust
One part 2,6-bis(trifluoromethyl)-4nitrobenzimidazole is mixed with 99 parts of talc after both ingredients have been ground finely enough to pass through a 325 mesh sieve.

Benzimidazoles represented by Formula I above have an extremely broad insecticidal and acaricidal spectrum. The compounds are particularly active against insects belonging to the order Coleoptera--beetles-- -including both larval and adult forms of Mexican bean beetle, boll weevil, corn rootworm, cereal leaf beetle, flea beetles, borers, Colorado potato beetle, grain beetles, alfalfa weevil, carpet beetle, confused flour beetle, powder post beetle, wireworms, rice weevil, rose beetle, plum curculio and white grubs. 2-Fluoroalkyl-6-fluoromethyl-4-nitrobenzimidazoles are also extremely active against insects of the order Hemiptera, including melon aphid, rose aphid, whitefly, grain aphid, corn leaf aphid, pea aphid, mealybugs, scales, leafhoppers, citrus aphid, spotted alfalfa aphid, green peach aphid and bean aphid. The compounds also have an extremely high acaricidal activity, being effective against red spider mite (at application rates of 10 ppm or less), clover mite, rust mite, citrus mite, two-spotted spider mite, fowl mite, and ticks. These compounds are also active against insects of the order Heteroptera, such as milkweed bug, tarnished plant bug, box elder bug, bed bug, squash bug and chinch bug; Diptera, such as housefly, yellow fever mosquito, stable fly, horn fly, cabbage maggot, and carrot rust fly; and Lepidoptera, such as Southern armyworm, coddling moth, cutworm, cloths moth, Indianmeal moth, leafrollers, corn earworm, European corn borer, cabbage looper, cotton bollworm, bagworm, sod webworm and fall armyworm. Finally, the compounds have shown activity against roaches of the order Orthoptera at rates comparable to those employed with presently marketed insecticides for the purpose of roach control.

The insecticidal and acaricidal activity of the compounds of this invention is illustrated by the following tests against representative insects and mites.

TEST METHODS

Mexican Beans Beetle-*Epilachna varivestis* (Coleoptera)

Cuttings of four six-day-old Bountiful snap bean plants, containing two leaves with approximately 5 square inches of leaf surface, are placed in water. The leaves are sprayed to wetting with about 5–10 ml. of a formulation containing a predetermined level of the test compound. Half of the formulation is sprayed on the top surface and half on the bottom surface of the leaf using a DeVilbiss atomizer at 10 psi held at a distance of about 18 inches from the leaf. After the leaves have dried, they are cut from the stem and placed separately in petri dishes. Ten third instar, nonmolting Mexican bean beetle larvae grown on Bountiful snap beans are placed on each leaf. Controls consist of two leaves sprayed with 5 ml. of a 500 ppm malathion formulation (reference standard), two leaves sprayed with the formulation without the active ingredient, and two leaves are held as untreated controls. After 48 hours, a mortality count is made and the amount of feeding noted. Moribund larvae are counted as dead. The following rating scale is used:

| Percent dead | Rating |
|---|---|
| 0-10 | 0 |
| 11-20 | 1 |
| 21-30 | 2 |
| 31-40 | 3 |
| 41-50 | 4 |
| 51-60 | 5 |
| 61-70 | 6 |
| 71-80 | 7 |
| 81-90 | 8 |
| 91-100 | 9 |

Southern Armyworm-*Prodenia eridania* (Lepidoptera)

Ten uniform Southern armyworm larvae about 1–1.5 cm. in length, grown on Henderson lima beans, are placed on excised bean leaves in petri dishes. The bean leaves are obtained and sprayed with the insecticide in the same way as are the snap bean leaves in the Mexican bean beetle test. The reference standards in this instance are leaves sprayed with 5 ml. 100 ppm DDT solution. Mortality counts are made 48 hours after spraying and again moribund larvae are counted as dead. Missing larvae which have probably been eaten are considered alive. The same rating scale is used as in the Mexican bean beetle test.

Melon Aphid-*Aphis gossypii* (*Hemiptera*)

Four blue hubbard squash seeds are planted per container in vermiculite and the containers watered from the bottom. After 6 days, the two weakest plants are cut off and one cotyledon and the primary leaves are removed from each of the two remaining plants. The remaining cotyledon is infested with 100 melon aphids from a stock colony by pinning the cotyledon against an aphid-infested squash cotyledon from the colony and allowing the aphids to transfer. After transfer, the colony leaf is removed. Forty-eight hours later, the infested leaves are sprayed to wetting with formulations containing graded amounts of the insecticide using a DeVilbiss atomizer at 10 psi held at 12–15 inches from the plant. Controls consist of two infested, unsprayed squash plants and two infested plants sprayed to wetting with a formulation containing 100 ppm malathion as a reference standard. The mortality is estimated 24 hours after spraying by observation using a 10 power dissecting microscope. The same rating scale is used as before.

Housefly-*Musca domestica* (Diptera)

A. Contact

Rearing cages containing four-day-old adult houseflies are chilled at 35–40°F. for about 1 hour. One hundred flies are transferred from the rearing cage to each test cage using a small scoop. The caged flies are kept for 1–2 hours at 70–80°F. The cages are sprayed in the same manner as described for the milk-weed bug with 5 ml. of the test formulation. Two unsprayed cages are held as controls, and two cages are sprayed with a 50 ppm DDT formulation as a reference standard. Mortality counts are made 24 hours after spraying. All flies that do not fly or do not walk up from the bottom of the cage are considered moribund. The same rating scale is employed as heretofore.

B. Stomach

Ten chilled houseflies are taken from the rearing cage and placed in a covered petri dish. Sugar cubes treated with 0.2 ml. of a formulation containing a specified level of the insecticide are placed in the petri dish one hour after the flies have been removed from the chill room. Controls consist of sugar cubes treated with 0.2 ml. of deionized water and cubes treated wtih 0.2 ml. of a formulation containing 500 ppm of malathion. Mortality counts are made 24 hours later. The same rating scale is used as before.

Oriental Cockroach-*Blatta orientalis* (Orthoptera)

A rearing pan of late instar (3–4 months old) roaches is placed in a cold room for about 1 hour. Ten nymphs are taken from the pan and placed in each cage, and the caged insects are kept at 70–80°F. for 1 hour. The test cages are then sprayed in the manner indicated above in the milkweed bug test using 5 ml. of a formulation containing a specified amount of the insecticide. The test cages are held for 72 hours during which time the cockroaches are neither fed nor watered. Controls consist of 2 unsprayed cages, two cages sprayed with the formulation alone, and 2 cages with a formulation containing 1,000 ppm of heptachlor. Mortality counts are made 24 hours after spraying by shaking the cages lightly. All cockroaches remaining in the bottom are counted as dead.

Boll Weevil-*Anthonomus grandis* (Coleoptera)

The procedure is identical to that employed for the Mexican bean beetle and the Southern armyworm, except that 10 adult boll weevils are placed on cotton leaves that have been dipped into formulations of the test compounds. The same rating scale is used.

TEST RESULTS

The following tables show the effect of the compounds of this invention against the above insect and mite species. In each of the following tables, the compounds under test are indicated by letters according to the following chart:

A 2,6-bis(trifluoromethyl)-4-nitrobenzimidazole
2,6-bis(trifluoromethyl)-4-nitrobenzimidazole, sodium salt
C 2-chlorodifluoromethyl-4-nitro-6-trifluoromethylbenzimidazole
D 2-trifluoromethyl-4-nitro-6-difluoromethylbenzimidazole In the following tables, the insect or mite used as the test organism is indicated in the heading. Column 1 of the table itself gives the code letter for the test compound and columns 2 etc., the average rating using the above rating scale from 0–9 at decreasing concentrations beginning at 1,000 ppm to the point where the insecticide shows virtually no activity. Included in each test are one or more standard insecticides.

TABLE 1

Mexican Bean Beetle Test

Ratings in p.p.m.

| Compound: | 1,000 | 500 | 250 | 100 | 50 | 25 | 10 | 5 |
|---|---|---|---|---|---|---|---|---|
| A | 9 | 9 | 9 | 9 | 9 | 9 | 9 | 7 |
| B | 9 | 9 | 9 | 9 | 8 | 6 | 7 | 2 |
| C | | 9 | 9 | 9 | 8.5 | 9 | 7 | 4 |
| D | 9 | 7.5 | 9 | 5.5 | 1.5 | | | |
| Malathion | | 7–8 | | | | | | |

TABLE 2

Southern Armyworm Test
Ratings in ppm

| Compound | 1000 | 500 | 250 | 100 |
|---|---|---|---|---|
| A | 9 | 6 | 3 | - |
| B | 9 | 4 | 3 | 0 |
| C | - | 1.5 | - | - |
| D | 8 | .5 | - | - |
| DDt | | | | 7 |

TABLE 3

Melon Aphid Test

Ratings in p.p.m.

| Compound: | 1,000 | 500 | 250 | 100 | 50 | 25 | 10 | 5 |
|---|---|---|---|---|---|---|---|---|
| A | 9 | 8 | 8 | 7 | 5 | 1 | 0 | |
| B | 9 | 9 | 8 | 7 | 7 | 8 | 9 | 0 |
| C | | 9 | 9 | 9 | 6 | 5.5 | 0 | |
| D | 9 | 9 | 9 | 7 | 0 | | | |
| Malathion | | | | | 8 | | | |

TABLE 4

Two-Spotted Spider Mite Test

Ratings in p.p.m.

| Compound: | 1,000 | 500 | 250 | 100 | 50 | 25 | 10 | 5 | 2.5 | 1 |
|---|---|---|---|---|---|---|---|---|---|---|
| A | 9 | 9 | 9 | 9 | 9 | 9 | 8 | 5 | | |
| B | 9 | 9 | 9 | 9 | 9 | 8.5 | 6 | 5 | 1 | |
| C | | 9 | 9 | 9 | 9 | 9 | 8 | 7.5 | | 0 |
| D | 9 | 9 | 8.5 | 6.5 | 1 | | | | | |
| Aramite | | | | | | 7–9 | | | | |

TABLE 5

Milkweed Bug Test

Ratings in p.p.m.

| Compound: | 1,000 | 500 | 250 | 100 | 50 | 25 | 10 |
|---|---|---|---|---|---|---|---|
| A | 9 | 9 | 9 | 7 | 4 | 4 | 5 |
| B | 9 | 9 | 9 | 2 | 2 | 1 | |
| C | | 9 | 9 | 4.5 | 6 | 0 | 0 |
| D | 9 | 9 | 9 | 3.5 | .5 | | |
| Malathion | | 7–8 | | | | | |

TABLE 6

Housefly (Contact) Test

Ratings in p.p.m.

| Compound: | 1,000 | 500 | 250 | 100 | 50 | 25 | 10 |
|---|---|---|---|---|---|---|---|
| A | 9 | 9 | 9 | 9 | 8 | 8 | 4 |
| B | 9 | 9 | 9 | 9 | 8.5 | 3 | 3 |
| C | | 9 | 9 | 9 | 9 | 9 | 1 |
| D | 9 | 9 | 9 | 9 | 9 | 9 | 8.5 |
| DDT | | | | | 6–8 | | |

TABLE 7

Housefly (Stomach) Test

Ratings in p.p.m.

| Compound: | 1,000 | 500 | 250 | 100 | 50 | 25 | 10 | 5 |
|---|---|---|---|---|---|---|---|---|
| A | | 9 | 9 | 9 | 7 | 2 | | |
| B | | 9 | 9 | 9 | 9 | 4 | 1 | |
| C | | | 9 | 9 | 7 | .5 | | |
| D | | 9 | | 5.5 | 0 | 0 | 0 | |
| Malathion | | 6–7 | | | | | | |

TABLE 8

Oriental Roach Test

Ratings in p.p.m.

| Compound: | 1,000 | 500 | 250 | 100 | 50 | 25 | 10 |
|---|---|---|---|---|---|---|---|
| A | 7 | 4 | 5 | 0 | | | |
| B | 9 | 6 | 2 | 3.5 | 1 | .5 | 0 |
| C | | 5.5 | 1 | 0 | 0 | | |
| D | 9 | 1.5 | 0 | | | | |
| Heptachlor | 8–9 | | | | | | |

TABLE 9

Boll Weevil Test

Ratings in p.p.m.

| Compound: | 1,000 | 500 | 250 | 100 | 50 | 25 | 10 | 5 |
|---|---|---|---|---|---|---|---|---|
| A | 9 | 9 | 9 | 9 | 8.5 | 8.8 | 6.7 | 7.5 |
| B | 9 | 9 | 8.5 | 9 | 9 | 8.5 | 6 | 6 |
| C | | 9 | 9 | 9 | 9 | 1.5 | .5 | |
| D | 7.5 | 8.5 | 8.5 | 5 | 1.5 | | | |
| Malathion | 7–8 | | | | | | | |

In addition to their use as insecticides, the benzimidazoles of Formula 1 are herbicidally active. In practice, the benzimidazole is applied in a suitable formulation at the rate of from 0.5 to 8 pounds per acre to an area which is to be seeded to a crop plant, such as corn, cotton or soybeans, which area contains, in addition, weed seeds belonging to both monocotyledonous and dicotyledonous weed species; i.e., the herbicidal benzimidazole is applied pre-emergently to both crops and weeds. For application to a particular area, the benzimidazole can be formulated as a wettable powder, as a liquid emulsion, or in solid form as a dispersion on a solid carrier.

The unusually high ability of compounds included within the scope of the above formula to perform as effective pre or post-emergent herbicides has been demonstrated in the greenhouse. In this evaluation, a soil was prepared consisting of one part masonry sand and one part shredded top soil blended together in a cement mixer. One gallon of this soil was placed in a 25 × 35 cm. galvanized flat and was patted down with a bench brush until level. A three-row marker was used to make 2 ½ cm. deep furrows in approximately two-fifths of the flat. Crop seeds consisting of four kernels of corn, five cotton seeds and five soybean seeds were placed in these furrows. A four-row template was then placed on the remaining soil, and the indicated approximate numbers of each of the following seeds were planted, one species to each section: foxtail (millet), 80–100 seeds; velvetleaf (40–50 seeds); rough pigweed (150–250 seeds); and large crabgrass (100–150 seeds).

Sufficient soil was added to cover the entire flat. Thus, the weed seeds were covered to a depth of about 6 mm. and the crop seeds were covered to a depth of about 3 cm.

In assaying the effect of a compound as a pre-emergent herbicide, a flat prepared as above, taken either on the day of planting or on the next day, was placed in a chamber equipped with a turntable and an air exhaust. The herbicidal composition, containing the test compound formulated as either a spray-type emulsion or a wettable powder, was applied to the flat with a modified DeVilbiss atomizer hooked to an air source. Twelve and one-half milliliters of the composition under test were applied to each flat either on the day of planting or the succeeding day. Injury ratings and observations as to type of injury were made 11–12 days after treatment. The injury rating scale used was as follows:

0 -- no injury
1 -- slight injury
2 -- moderate injury
3 -- severe injury
4 -- death When more than one determination was carried out at a given rate, an average value was calculated for the injury rating. Each compound evaluated was formulated as a spray by one of the following procedures: (1) The compound was wetted by grinding in a mortar with one part of polyoxyethylene sorbitan monolaurate. Five hundred parts of water were added slowly to the resultant creamy paste to give an aqueous dispersion with a surfactant concentration of 0.2 percent. (2) The compound was dissolved in one volume of acetone, and the acetone solution was diluted with nineteen volumes of water containing 0.1 percent of polyoxyethylene sorbitan monolaurate.

The following table sets forth the results of the above evaluation. In the Table, column 1 gives the name of the compound under test; column 2, the rate in pounds per acre at which the compound was applied to the text flat; and the remaining columns, the injury to the particular plant seeds or seedlings as measured by the foregoing scale.

The same three compounds as in Table 10 were evaluated as post-emergent herbicides by application to the same seven plant and weed species. The evaluation was carried out in accordance with the pre-emergent test procedure except that the test solutions were applied about 9–12 days after the preparation and seeding of the flats. The results are set forth in table 11.

In utilizing the compounds of this invention as herbicides, it is customary to employ a dispersion of the herbicidal benzimidazole as the active ingredient. Such dispersion can be applied in liquid form by spraying or in solid form by using a fertilizer applicator or the like. Formulations suitable for spraying can be prepared as emulsifiable concentrates or wettable powders.

Typical useful formulations include the following:
1. Liquid Formulation
   60 mg. of 2-chlorodifluoromethyl-4-nitro-6-trifluoromethylbenzimidazole
   1.25 ml. of ethanol
   12.5 ml. of water
   0.0125 ml. of dispersant Useful dispersants for the above formulation include a mixture of the calcium salt of benzene dodecylsulfonate and either a polyoxyethylene ether of nonylphenol containing 9 ethylenoxide residues in the polyoxyethylene chain or a polyoxyethylene-sorbitan monoeleate.

2. Solid Formulation
   25 grams of 2,5-bis-trifluoromethyl-7-nitrobenzimidazole
   70.5 grams of kaolin
   1.5 grams of sodium lignin sulfonate
   3 grams of a polyoxyethylene ether of nonylphenol containing
   9 ethylenoxide residues in the polyoxyethylene chain.

As can be seen from the above tables, the compounds represented by the above formula are useful as all-purpose post-emergent herbicides, showing a marked ability to virtually eliminate weeds and crop plants at application rates varying from 0.5 to 8 pounds per acre

TABLE 10

Injury Rating on Pre-emergent Treatment

| Compound | Lbs./acre | Corn | Cotton | Soybean | Crabgrass | Pigweed | Foxtail | Velvet leaf |
|---|---|---|---|---|---|---|---|---|
| 2,5-bis(trifluoromethyl)-7-nitrobenzimidazole | 8 | 1.5 | 2 | 2.5 | 4 | 4 | 4 | 4 |
| | 4 | 1 | 1 | 2 | 3 | 4 | 4 | 4 |
| | 2 | .3 | 0 | .3 | 3.3 | 3.7 | 2.7 | 2 |
| | 1 | 0 | 0 | 0 | 3 | 4 | 2.3 | 1.7 |
| | .5 | 0 | 0 | 0 | 3 | 4 | 1.7 | 0.3 |
| | .25 | 0 | 0 | 0 | 1.5 | 4 | .5 | 0 |
| 6-difluoromethyl-4-nitro-2-trifluoromethylbenzimidazole | 8 | 0 | 0 | 0 | 1 | 1 | 0 | 1 |
| 2-chlorodifluoromethyl-4-nitro-6-trifluoromethylbenzimidazole | 8 | 2 | 0 | 3 | 2 | 2 | 1 | 0 |

TABLE 11

Injury Rating on Post-emergent Treatment

| Compound | Lbs./acre | Corn | Cotton | Soybean | Crabgrass | Pigweed | Foxtail | Velvet leaf |
|---|---|---|---|---|---|---|---|---|
| 2,5-bis(trifluoromethyl)-7-nitrobenzimidazole | 8 | 2.5 | 3 | 4 | 3.5 | 4 | 4 | 4 |
| | 4 | 2 | 3 | 4 | 3 | 4 | 4 | 4 |
| | 2 | 1.3 | 2 | 2.7 | 2.7 | 4 | 4 | 3 |
| | 1 | 1 | 1.3 | 1.7 | 3 | 3 | 3.7 | 2.5 |
| | .5 | 1 | 0.5 | 1 | 3 | 2.5 | 2 | 0.0 |
| | .25 | 0 | 0 | 1 | 2 | 0 | 1 | |
| 6-difluoromethyl-4-nitro-2-trifluoromethylbenzimidazole | 8 | 0 | 4 | 3 | 2 | 4 | 3 | 4 |
| | 4 | 1 | 4 | 4 | 3 | 4 | 2 | 4 |
| | 2 | 0 | 2 | 2 | 1 | 4 | 2 | 4 |
| | 1 | 0 | 0 | 1 | 0 | 0 | 0 | 1 |
| 2-chlorodifluoromethyl-4-nitro-6-trifluoromethylbenzimidazole | 8 | 4 | 4 | 4 | 4 | 4 | 4 | 4 |
| | 4 | 2 | 4 | 3 | 4 | 4 | 4 | 4 |
| | 2 | 3 | 3.5 | 3 | 3.5 | 4 | 4 | 4 |
| | 1 | 3 | 2.3 | 2.7 | 2.7 | 3.7 | 4 | 3.3 |
| | 0.5 | 2.5 | 1 | 1.5 | 2 | 2.5 | 3 | 1.0 |
| | 0.25 | 1 | 0 | 2 | 0 | 1 | 0 | 5 | depending upon the particular compounds. In addition, according to Table 10, 2,5-bis-trifluoromethyl-7-nitrobenzimidazole shows an excellent selective herbicidal action in killing weeds at application rates at which crops, particularly corn, are not harmed to any significant degree. Because of the extremely high post-emergent activity of the compounds represented by the above formula and the corresponding lack of herbicidal activity against crop plants pre-emergent, it is of course possible to employ the compounds in processes which involve applying them pre-emergent to the crops but post-emergent to the weeds. As will be understood by those skilled in the art, however, the opportunities for such selective type of application are strictly limited as compared with application pre-emergent to both weeds and crops.

The compounds utilized in this invention are prepared by the method of Phillips, i J. Chem. Soc. 1928, 2393. According to this procedure, a suitably substituted o-phenylenediamine and an organic acid are condensed in the presence of a strong acid, usually hydrochloric acid, to yield the desired product. Inasmuch as the fluoroacetic acids have acid strengths equivalent to those of strong mineral acids, the synthesis of 2-fluoromethylbenzimidazoles represented by the above formula can be accomplished without the addition of a mineral acid. A typical preparation follows:

EXAMPLE I 2,6-Bis(trifluoromethyl)-4-nitrobenzimidazole

A solution of 40.5 g. of 2,6-dinitro-4-trifluoromethyl-1-chlorobenzene in 300 ml. of benzene was mixed with 250 ml. of 14 N ammonium hydroxide. The reaction mixture was stirred at room temperature for about 1.5 hours, at which point in time another 100 ml. of 14 N ammonium hydroxide were added and the stirring was continued for an additional 2 hours. The organic layer was separated, was washed with water, and was dried. Removal of the solvents in vacuo yielded 2,6-dinitro-4-trifluoromethylaniline, which melted at about 142–144°C. after recrystallization from a hexane-benzene solvent mixture.

Twenty-four grams of 2,6-dinitro-4-trifluoromethylaniline were dissolved in 300 ml. of ethanol. The solution was heated to about 35°C., and 110 ml. of a 20 percent ammonium polysulfide solution containing 5 percent free sulfur was added. The temperature of the reaction mixture rose spontaneously to about 60°C., at which temperature it was maintained by heating for about 10 minutes. The reaction mixture was cooled to about 40°C. and poured into water. The resulting mixture was filtered. Excess benzene was added to the filtrate which was then evaporated to dryness in vacuo using the water-benzene azeotrope. Recrystallization of the resulting solid yielded purified 3-nitro-5-trifluoromethyl-o-phenylenediamine, 10 ml. of trifluoroacetic acid and 25 ml. of water was refluxed for about 4 hours. The reaction product containing 2,6-bis(trifluoromethyl)-4-nitrobenzimidazole was poured into water and stirred until it solidified. The benzimidazole was dissolved in base at pH=11 and the solution filtered. The pH was then lowered to about 7, at which point 2,6-bis(trifluoromethyl)-4-nitrobenzimidazole began to crystallize. The compound was separated by filtration, the filter cake washed with water and then dried. Recrystallization from a benzenehexane solvent mixture yielded 2,6-bis(trifluoromethyl)-4-nitrobenzimidazole, melting at about 95–97°C.

Analysis, Calc.: C, 36.13; N, 14.05; H, 1.01
Found: C, 36.24; N, 13.87; H, 1.32

Compounds in which the substituent on the 2-position of the benzimidazole ring is other than trifluoromethyl are prepared by the method of Smith and Stienle, J. Am. Chem. Soc. 75, 1292 (1953), which method in this instance involves the heating of an appropriately substituted o-phenylenediamine with trifluoroacetic acid, pentafluoropropionic acid, difluoroacetic acid, heptafluorobutyric acid, or chlorodifluoroacetic acid, optionally in the presence of dilute HC1. 2-Chlorodifluoromethyl-4-nitro-6-trifluoromethylbenzimidazole prepared in this way melts at about 97°–98-°C. after recrystallization from hexane.

Analysis, Calc.: C, 34.25; H, 0.96; N, 13.31
Found: C, 34.50; H, 1.01; N, 13.35.

Compounds in which the substituent in the 6(5)-position of the benzene ring of the benzimidazole is difluoromethyl are prepared from 2,6-dinitro-4-difluoromethyl-1-cholorobenzene according to the above procedure. This latter compound is prepared by the reaction of SF4 and 3,5-dinitro-4-hydroxybenzaladehyde to yield 2,6-dinitro-4-difluoromethylphenol which is converted to the corresponding chloride by conventional means. 2-Trifluoromethyl-4-nitro-6-difluoromethylbenzimidazole was prepared from the above chloride by the process of the above example and melted at about 132°–134°C. after recrystallization from benzene.

Analysis, Calc.: C, 38.44; H, 143; N, 14.93
Found: C, 38.30; H, 1.40; N, 14.82.

EXAMPLE II

Preparation of Salts

A mixture is prepared containing 6 g. of 2,6-bis(trifluoromethyl)-4-nitrobenzimidazole, 1.1 g. of sodium methoxide, and 100 ml. of methanol. The reaction mixture is shaken and filtered. Evaporation of the filtrate to dryness yields a mixture of the sodium salt of 2,6-bis(trifluoromethyl)-4-nitrobenzimidazole the the sodium salt of 2,5-bis(trifluoromethyl)-7-nitrobenzimidazole, melting at about 200°C. The compound is water soluble, but insoluble in acid.

Other alkali metal salts of 2,6-bis(trifluoromethyl)-4-nitrobenzimidazole are prepared by substituting the appropriate metal alkoxide for sodium methoxide in the above preparation. Thus, the lithium, potassium, cesium, rubidium, and strontium salts of 2,6-bis(trifluoromethyl)-4-nitrobenzimidazole (and its tautomer) can be prepared.

The above salts are useful in preparing derivatives of the above benzimidazoles, as set forth in my co-pending application, Ser. No. 812,449, filed Apr. 1, 1969.

While the compounds of this invention resemble the organic phosphates and other insecticides in being toxic upon ingestion, they differ from the organic phosphates in having a low toxicity when applied to the skin. The following charts give the estimated acute oral and acute dermal toxicities of 2,6-bis-(trifluoromethyl)-4-nitrobenzimidazole in several species of mammals.

TABLE 10

Acute Oral Toxicity of 2,6-bis(trifluoromethyl)-4-nitrobenzimidazole

| Animals Used | Est. LD50, mg./kg. |
|---|---|
| Mouse, female | 27 |
| Rat, male | 16–20 |
| Rat, female | 19–22 |
| Guinea Pig, male | 15 |
| Guinea Pig, female | 15 |

TABLE 13

Acute Dermal Toxicity of 2,6-bis(trifluoromethyl)-4-nitrobenzimidazole

| Animals Used | Est. LD50, mg./kg. |
|---|---|
| Rabbit, male | >500 |
| Rabbit, female | >500 |

I claim:

1. 2,6-bis(trifluoromethyl)-4-nitrobenzimidazole.

* * * * *

UNITED STATES PATENT OFFICE
CERTIFICATE OF CORRECTION

PATENT NO. : 3,755,346
DATED : August 28, 1973
INVENTOR(S) : Quentin F. Soper

It is certified that error appears in the above-identified patent and that said Letters Patent are hereby corrected as shown below:

Column 4, line 58, "cloths" should read --clothes--.

Column 6, line 57, insert --B-- at the beginning of the line.

Column 11, line 18, delete the "i" before the "J.".

Column 12, line 33, insert a decimal point between the "1" and "4" of "H, 143;".

Signed and Sealed this

Second Day of November 1976

[SEAL]

Attest:

RUTH C. MASON
Attesting Officer

C. MARSHALL DANN
Commissioner of Patents and Trademarks